United States Patent
Yan

(10) Patent No.: US 10,923,072 B2
(45) Date of Patent: Feb. 16, 2021

(54) METHOD AND DEVICE FOR DISPLAYING NON-STANDARD RESOLUTION DATA

(71) Applicants: BOE TECHNOLOGY GROUP CO., LTD., Beijing (CN); K-TRONICS (SUZHOU) TECHNOLOGY CO., LTD., Jiangsu (CN)

(72) Inventor: Zhihao Yan, Beijing (CN)

(73) Assignees: BOE TECHNOLOGY GROUP CO., LTD., Beijing (CN); K-TRONICS (SUZHOU) TECHNOLOGY CO., LTD., Suzhou (JP)

( * ) Notice: Subject to any disclaimer, the term of this patent is extended or adjusted under 35 U.S.C. 154(b) by 428 days.

(21) Appl. No.: 15/751,341

(22) PCT Filed: Aug. 18, 2017

(86) PCT No.: PCT/CN2017/098054
§ 371 (c)(1),
(2) Date: Feb. 8, 2018

(87) PCT Pub. No.: WO2018/126698
PCT Pub. Date: Jul. 12, 2018

(65) Prior Publication Data
US 2020/0234673 A1 Jul. 23, 2020

(30) Foreign Application Priority Data
Jan. 9, 2017 (CN) .......................... 2017 1 0013819

(51) Int. Cl.
*G09G 5/00* (2006.01)
*G06F 3/14* (2006.01)
*G09G 5/22* (2006.01)
(52) U.S. Cl.
CPC ........... *G09G 5/005* (2013.01); *G06F 3/1407* (2013.01); *G09G 5/227* (2013.01)

(58) Field of Classification Search
CPC .... G06F 3/1423; G06F 3/1415; G06F 3/0486; G06F 3/1431; G06F 3/1446
See application file for complete search history.

(56) References Cited

U.S. PATENT DOCUMENTS 5,999,220 A * 12/1999 Washino .............. H04N 7/0125
348/441
8,698,963 B1 * 4/2014 Cian .................... H04N 9/3147
348/744
(Continued)

FOREIGN PATENT DOCUMENTS

| CN | 1402572 A | 3/2003 |
| CN | 1920767 A | 2/2007 |

(Continued)

OTHER PUBLICATIONS

The First Chinese Office Action dated Jan. 2, 2019; Appln. No. 201710013819.5.
(Continued)

*Primary Examiner* — Jennifer Mehmood
*Assistant Examiner* — James S Nokham

(57) ABSTRACT

A method and a device for displaying non-standard resolution data are provided. The method includes: reading signal source data and determining whether the signal source data is standard resolution data; in a case that the signal source data is non-standard resolution data, determining whether the non-standard resolution data is already stored in a memory; in a case that the non-standard resolution data is already stored in the memory, displaying the non-standard resolution data; and in a case that the non-standard resolution data is not stored in the memory, storing the non-standard resolution data in the memory and displaying the non-standard resolution data.

20 Claims, 6 Drawing Sheets

(56) References Cited

U.S. PATENT DOCUMENTS

| | | | | |
|---|---|---|---|---|
| 2002/0149594 A1* | 10/2002 | Grigor | ................. | G06F 3/1415 345/536 |
| 2004/0080482 A1* | 4/2004 | Magendanz | .......... | G06F 3/1431 345/100 |
| 2008/0129761 A1* | 6/2008 | Kim | .................... | G09G 3/2096 345/690 |
| 2008/0134061 A1* | 6/2008 | Banerjee | ............ | G06F 3/1423 715/762 |
| 2009/0096876 A1* | 4/2009 | Herberger | ............ | G11B 27/034 348/207.1 |
| 2011/0148742 A1* | 6/2011 | Perkins | ................. | G06F 3/1446 345/1.3 |
| 2011/0173644 A1* | 7/2011 | Teng | ....................... | G06F 9/451 719/329 |
| 2011/0268175 A1 | 11/2011 | Tan et al. | | |
| 2012/0089935 A1* | 4/2012 | Santori | ................. | G06F 3/0486 715/771 |
| 2016/0313789 A1* | 10/2016 | Krishnakumar | ........ | G06F 1/325 |

FOREIGN PATENT DOCUMENTS

| | | |
|---|---|---|
| CN | 101686346 A | 3/2010 |
| CN | 105245898 A | 1/2016 |
| CN | 105279006 A | 1/2016 |
| CN | 105872547 A | 8/2016 |
| CN | 10668518 A | 5/2017 |

OTHER PUBLICATIONS

International Search Report ad Written Opinion dated Nov. 23, 2017; PCT/CN2017/098054.

\* cited by examiner

200 reading signal source data and determining whether the signal source data is standard resolution data
201

↓ in a case that the signal source data is non-standard resolution data, determining whether the non-standard resolution data is already stored in a memory
221

↓ in a case that the non-standard resolution data is already stored in the memory, displaying the non-standard resolution data
241

↓ in a case that the non-standard resolution data is not stored in the memory, storing the non-standard resolution data in the memory and displaying the non-standard resolution data
261

```
comparing parameters corresponding to latest-obtained non-
standard resolution data with parameters corresponding to non-
standard resolution data that is already stored in the memory one
                            by one
                             271
```

↓

```
in a case that differences obtained by comparing the parameters
are all within setting ranges, determining that the latest-obtained
non-standard resolution data and one of the stored non-standard
resolution data belong to a same type of non-standard resolution
                            data
                            272
```

FIG. 2B

METHOD AND DEVICE FOR DISPLAYING NON-STANDARD RESOLUTION DATA

TECHNICAL FIELD

Embodiments of the present disclosure relate to a method and device for displaying non-standard resolution data.

BACKGROUND

With increase of demands from customers for multimedia services, there are more and more types of display signals output by signal sources. Some of these display signals conform to display standards while others do not conform to the display standards. For non-standard display data that do not conform to the display standards, most display terminal devices directly prompt a user that the non-standard display data cannot be displayed normally, in addition to using customized processing methods on the display terminal devices.

SUMMARY

At least one embodiment of the present disclosure provides a method for displaying non-standard resolution data, comprising: reading signal source data and determining whether the signal source data is standard resolution data; in a case that the signal source data is non-standard resolution data, determining whether the non-standard resolution data is already stored in a memory; in a case that the non-standard resolution data is already stored in the memory, displaying the non-standard resolution data; and in a case that the non-standard resolution data is not stored in the memory, storing the non-standard resolution data in the memory and displaying the non-standard resolution data.

For example, storing the non-standard resolution data in the memory comprises: allocating a unique identifier and a unique storage address for the non-standard resolution data, and collectively storing the non-standard resolution data, the unique identifier and a start address of the storage address.

For example, determining whether the non-standard resolution data is already stored in the memory comprises: searching the memory to determine whether the non-standard resolution data is stored in the memory. In a case that it is determined that the non-standard resolution data is stored in the memory, the non-standard resolution data is addressed using the unique identifier and the start address.

For example, the method further comprises: in a case that the non-standard resolution data is not stored in the memory, storing the non-standard resolution data in the memory using a structure. The structure comprises: a total number of pixels in a horizontal direction, a total number of pixels in a vertical direction, a start dotting position for the horizontal direction, a start dotting position for the vertical direction, a horizontal frequency and a vertical frequency.

For example, the structure further comprises: a storage start position.

For example, the structure further comprises a storage serial number, wherein the storage serial number is used for representing which type of non-standard resolution data the non-standard resolution data to be stored is.

For example, the structure further comprises an automatic time parameter, wherein the automatic time parameter is a parameter for automatically aligning an analog signal.

For example, determining whether the non-standard resolution data is already stored in the memory comprises: comparing parameters corresponding to latest-obtained non-standard resolution data with parameters corresponding to non-standard resolution data that is already stored in the memory one by one; and in a case that differences obtained by comparing the parameters are all within setting ranges, determining that the latest-obtained non-standard resolution data and one of the stored non-standard resolution data belong to a same type of non-standard resolution data; wherein the parameters at least comprise a quantity of pixels in a vertical direction, a start dotting position for a horizontal direction and a start dotting position for the vertical direction.

For example, comparing parameters corresponding to latest-obtained non-standard resolution data with parameters corresponding to non-standard resolution data that is already stored in the memory one by one comprises: comparing the quantity of pixels in the horizontal direction, the quantity of pixels in the vertical direction, the start dotting position for the horizontal direction and the start dotting position for the vertical direction of the latest-obtained non-standard data with corresponding parameter values of the non-standard data that is already stored in the memory.

For example, the standard resolution data comprise: data that meets a video electronics standards association (VESA) standard or data that meets a data management platform (DMP) standard.

For example, the method for displaying non-standard resolution data further comprises: in a case that the signal source data belongs to the standard resolution data, displaying with a standard resolution.

At least one embodiment of the present disclosure also provides a device for displaying non-standard resolution data, comprising a memory and a processor. The memory is configured to store computer instructions. The processor is configured to, when executing the computer instructions, perform operations including: reading signal source data; determining whether the signal source data is standard resolution data; and in a case that it is determined that the signal source data is non-standard resolution data, performing the following operations: determining whether the non-standard resolution data is already stored in a memory; in a case that the non-standard resolution data is already stored in the memory, displaying the non-standard resolution data; and in a case that the non-standard resolution data is not stored in the memory, storing the non-standard resolution data in the memory and displaying the non-standard resolution data.

For example, the processor is configured to store the non-standard resolution data in an allocated storage address using a unique identifier, and store a start address of the storage address.

For example, the processor is further configured to search the stored non-standard resolution data according to the unique identifier and the start address.

For example, in a case that the non-standard resolution data is not stored in the memory, the processor is further configured to store the non-standard resolution data using a structure. The structure comprises: a total number of pixels in a horizontal direction, a total number of pixels in a vertical direction, a start dotting position for the horizontal direction, a start dotting position for the vertical direction, a horizontal frequency and a vertical frequency.

For example, the structure further comprises: a storage start position.

For example, the structure further comprises a storage serial number, wherein the storage serial number is used for representing which type of non-standard resolution data the non-standard resolution data to be stored is.

For example, the structure further comprises an automatic time parameter, wherein the automatic time parameter is a parameter for automatically aligning an analog signal.

For example, the standard resolution is used for displaying, in a case that the determining module determines that the signal source data belongs to the standard resolution data.

For example, the device for displaying non-standard resolution data further comprises: a display, configured to display the standard resolution data or directly display the non-standard resolution data.

BRIEF DESCRIPTION OF THE DRAWINGS

In order to clearly illustrate the technical solution of the embodiments of the disclosure, the drawings of the embodiments will be briefly described in the following. It is obvious that the described drawings are only related to some embodiments of the disclosure and thus are not limitative of the disclosure.

FIG. 2A is a flow chart of a method for displaying non-standard resolution data provided by an embodiment of the present disclosure;

FIG. 2B is another flow chart of a method for displaying non-standard resolution data provided by an embodiment of the present disclosure;

DETAILED DESCRIPTION

Figure 1:
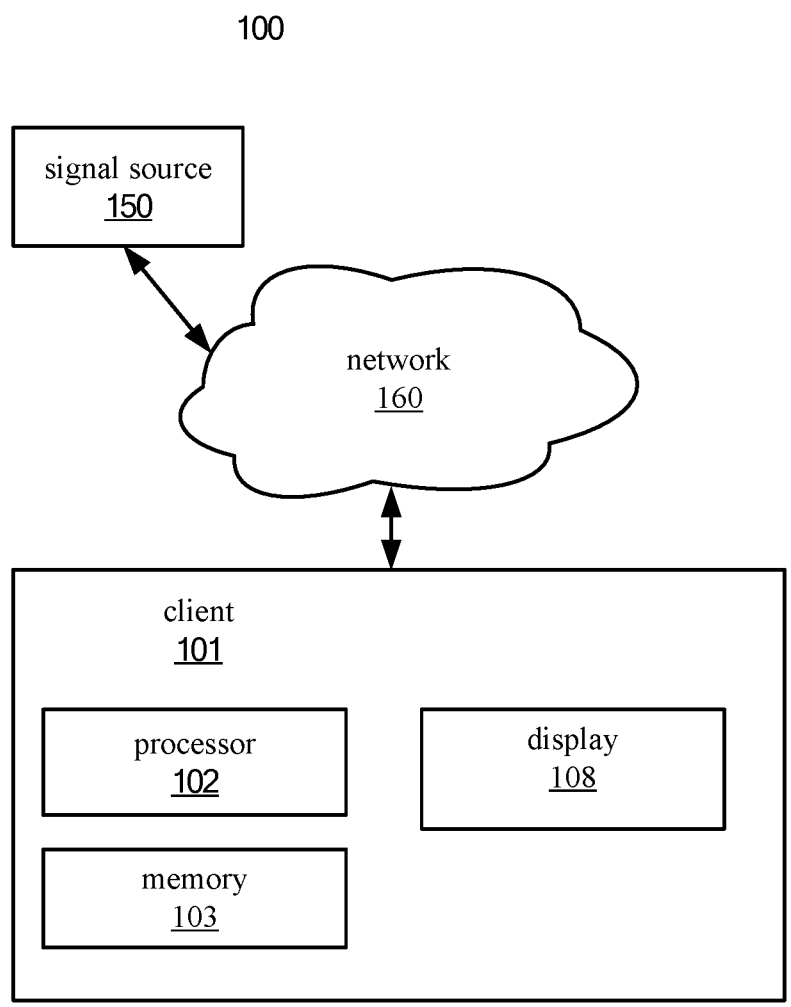
FIG. 1 is a schematic diagram of an application scenario provided by an embodiment of the present disclosure.

The technical solutions in the embodiments of the present disclosure will be described in a clearly and fully understandable way in connection with the drawings. Referring to the nonrestrictive exemplary embodiments illustrated in the drawings and detailed in the following description, the exemplary embodiments of the disclosure apparent, and features and advantageous details of the exemplary embodiments of the disclosure apparent are described more fully. It should be noted that the features illustrated in the drawings are not necessarily to be scaled. The disclosure omits descriptions of known materials, assemblies, and process technologies so as not to obscure the exemplary embodiments of the present disclosure. The examples presented are merely intended to facilitate an understanding of implementation of the exemplary embodiments of the present disclosure, and to further enable those skilled in the art to implement the exemplary embodiments. Therefore, these examples should not be construed as limit to the scope of the embodiments of the present disclosure.

Unless otherwise defined, all the technical and scientific terms used herein have the same meanings as commonly understood by one of ordinary skill in the art to which the present disclosure belongs. The terms "first," "second," etc., which are used in the description and the claims of the present application for disclosure, are not intended to indicate any sequence, amount or importance, but distinguish various components. In addition, in the embodiments of the present disclosure, the same or similar reference numerals represent the same or similar components.

Specific implementations of the method and device for displaying non-standard resolution data provided by the embodiments of the present disclosure are described in detail below with reference to the drawings.

Embodiments of the present disclosure provide a method for creating a non-standard resolution for non-standard resolution data in a drive program of a client device and displaying signal source data on a display of the client device based on the created non-standard resolution. For example, the client device reads the resolution data sent by the signal source and determines whether the resolution data meets a video electronics standards association (VESA) standard. In a case that the read resolution data is non-VESA-standard resolution data, it is needed to store the resolution data as a new non-standard resolution in the drive program, and then this type of non-standard resolution data can be displayed according to the new non-standard resolution. This is different from a current processing way that the non-standard resolution data is displayed as standard resolution data that is close to the non-standard resolution data, or the input non-standard resolution data is directly not displayed.

Embodiments of the present disclosure provide a way for displaying non-standard resolutions, and the way uses software (i.e., a drive program) inside a display terminal device to design and create the non-standard resolutions for displaying.

As illustrated in FIG. 1, in a scenario 100 for displaying non-standard resolution data, a client 101 and a signal source 150 are included. The client 101 can receive data from the signal source 150 through a network 160. In addition, the client 101 may also directly obtain data from the signal source 150 through a wired connection. In some examples, the signal source 150 may be integrated into the client 101 as part of the client 101.

The signal source 150 may be an electronic device, which can output a stable video signal. For example, the signal source may be a personal computer, a signal generator, a set-top box, or the like. For example, the signal source 150 may be configured to provide data to a display device through a network or a wired direct connection.

In some embodiments, the network 160 comprises, but is not limited to, a mobile communication access network (e.g., 4G, 3G), a wide area network, a local area network (e.g., WIFI), or the like. In another example, the network 160 comprises Internet.

For example, the client 101 may be a computing device which comprises a processor and a memory. For example, the client 101 may be a smart mobile phone or another terminal (e.g., a mobile terminal) that comprises a processor and a memory. In some embodiments, the client 101 may comprise a processor 102, a memory 103, a display 108, a browser (not illustrated in the drawing), and other components such as an input device (e.g., a microphone) and another output device (e.g., a speaker).

The processor 102 may process data signals and may comprise various computation structures such as a complex instruction set computer (CISC) structure, a reduced instruction set computer (RISC) structure, or a structure that implements a combination of multiple instruction sets. In some embodiments, the processor 102 may also be a microprocessor.

The memory 103 may store instructions and/or data executed by the processor 102. These instructions and/or data may comprise codes for implementing some or all functions of one or more modules described in the embodiments of the present disclosure. For example, the memory 103 comprises a dynamic random access memory (DRAM), a static random access memory (SRAM), a flash memory, an optical memory, or other memory well known by those skilled in the art.

The display 108 may be used to display data. For example, the display 108 may be an LCD display, a LED display, or another display. The display 108 may comprise a display with a touch function.

In some embodiments, the signal source 150 may also comprise components similar to those of the client 101, for example, a processor and a memory (not illustrated in the drawing), and the relevant functions of the processor and the memory of the signal source 150 are similar to those of the display 108, the processor 102, and the memory 103 of the client 101.

As illustrated in FIG. 2, embodiments of the present disclosure provide a method 200 for displaying non-standard resolution data. The method 200 for displaying the non-standard resolution data may comprises: in step 201, reading signal source data and determining whether the signal source data is standard resolution data; in step 221, in a case that the signal source data is non-standard resolution data, determining whether the non-standard resolution data is already stored in a memory; in step 241, in a case that the non-standard resolution data is already stored in the memory, displaying the non-standard resolution data; and in step 261, in a case that the non-standard resolution data is not stored in the memory, storing the non-standard resolution data in the memory and displaying the non-standard resolution data.

The embodiments of the present disclosure can convert non-standard signals input by any signal source into corresponding non-standard resolution data for displaying, instead of directly using standard resolution data that is close to the non-standard data to display the non-standard data or directly prompting a user that it is unable to display the non-standard data.

In some embodiments, implementation of the step 201 may comprises: first of all, reading the signal source data; after that, obtaining at least the following parameter information from the read data: the number of pixels in a horizontal direction, the number of pixels in a vertical direction, a start dotting position for the horizontal direction, and a start dotting position for the vertical direction; and then comparing the obtained parameter information with corresponding parameter information of the standard resolution data, and determining that the read signal source data belongs to the standard resolution data or the non-standard resolution data according to the comparison result. It should be noted that the standard resolution data referred to in the embodiments of the present disclosure may be resolution data that meets any display standard, for example, data that meets a VESA standard, data management platform (DMP) standard or another display standard. It is not limited by the present disclosure.

In some embodiments, determining whether the signal source data is the standard resolution data in the step 201 may comprise: determining whether the signal source data is data that meets the VESA standard, DMP standard or another standard.

In some embodiments, the non-standard resolution data may be stored in the memory (e.g., a flash) in the step 221. As illustrated in FIG. 2B, implementation of determining whether the non-standard resolution data is already stored in the memory in the step 221 may comprise: in step 271, comparing parameter information corresponding to latest-obtained non-standard resolution data (i.e., the signal source data that is non-standard resolution data) with parameter information corresponding to all the non-standard resolution data that is already stored in the memory in a piece-by-piece manner (where the parameter information at least comprises the number of pixels in the vertical direction, the start dotting position for the horizontal direction and the start dotting position for the vertical direction, etc.); and in step 272, when difference values obtained by comparing the corresponding parameter information are all within setting ranges, determining that the latest-input non-standard resolution data and one of the stored non-standard resolution data belong to a same type of non-standard resolution data. At this point, it can be determined that the latest-input non-standard resolution data is already stored in the memory. For example, a setting range may be that a difference value between a relevant parameter of the latest-input signal source data and a relevant parameter of the stored non-standard resolution data is less than a certain fixed value. For example, the number of pixels in the horizontal direction corresponding to the latest-received non-standard resolution data is compared with the number of pixels in the horizontal direction corresponding to the stored non-standard resolution data. In a case that an absolute value of the difference between the above two is less than a corresponding preset value (for example, the absolute value of the difference is less than or equal to 20), it can be further determined whether an absolute value of a difference value between the number of pixels in the vertical direction corresponding to the latest-received non-standard resolution data and the number of pixels in the vertical direction corresponding to the stored non-standard resolution data is less than a corresponding preset value. When the difference value between the numbers of pixels in the horizontal direction, the difference value between the numbers of pixels in the vertical direction, a difference value between the start dotting positions for the horizontal direction, and a difference value between the start dotting positions for the vertical direction each are less than or equal to a corresponding preset value, it can be determined that the latest-input non-standard resolution data and the stored non-standard resolution data belong to a same type of data. After that, the stored non-standard resolution data may be directly called to display the latest input data.

In some embodiments, the step 221 and the step 241 may comprise: searching the memory to determine whether the non-standard resolution data is stored in the memory; when it is determined that the non-standard resolution data is stored in the memory, addressing the non-standard resolution data using a unique identifier and a start address of the non-standard resolution data; and then displaying the signal source data based on the non-standard resolution data obtained by searching the memory. By directly addressing the stored non-standard data with the unique identifier and start address, the display operation of the non-standard data can be quickly responded to. That is to say, the non-standard resolution of the non-standard data input from the signal source is stored, thereby facilitating display of this type of non-standard data input subsequently. The configuration of the unique identifier is convenient for searching the stored non-standard resolution.

In some embodiments, when it is determined in the step 221 that the latest input non-standard resolution data is already stored, the latest input signal source data may be display directly using the stored non-standard resolution data in the step 241.

By outputting the stored non-standard resolution data, the display speed of the non-standard data using the non-standard resolution can be further increased.

In some embodiments, the non-standard resolution data may be stored in a newly defined structure in the step 261. The newly defined structure comprises parameters as follows: the number of pixels in the horizontal direction, the number of pixels in the vertical direction, the start dotting position for the horizontal direction, the start dotting position for the vertical direction and so on. In addition, the new structure may also comprise: a storage start position and a storage serial number allocated for the non-standard resolution data to be stored. The storage serial number is used for representing which type of non-standard resolution data the non-standard resolution data to be stored is.

By storing the non-standard data using the defined structure, it is convenient to display when the signal source inputs a same type of non-standard data next time. In addition, through the newly defined structure, it can be determined that which one of the stored non-standard data and the non-standard data input by the signal source belong to a same type, and then the stored non-standard data of the same type are used for displaying. A method for extracting features of the signal source data is recorded by the defined structure, and then the type of the signal source and the method for generating the relevant non-standard resolution can be determined according to the extracted features of the signal source.

Implementation of storing the non-standard resolution data in the memory in the step 261 further comprises: allocating a unique identifier and a unique storage address for the non-standard resolution data, and collectively storing the non-standard resolution data, the unique identifier and a start address of the storage address. For example, in the step 261, the non-standard resolution data is stored in the memory using a structure, where the structure comprises: the total number of pixels in the horizontal direction, the total number of pixels in the vertical direction, the start dotting position for the horizontal direction, the start dotting position for the vertical direction, a horizontal frequency, a vertical frequency and so on.

Through the above storage strategy, the newly obtained non-standard resolution data can be timely stored in the memory (for example, a flash) for subsequent search.

In some embodiments, in order to ensure display quality of an analog signal, the structure may further define an automatic time parameter. For example, the automatic time parameter may be used for performing a function of automatically aligning the analog signal to ensure that the displayed image is centered.

Figure 3:
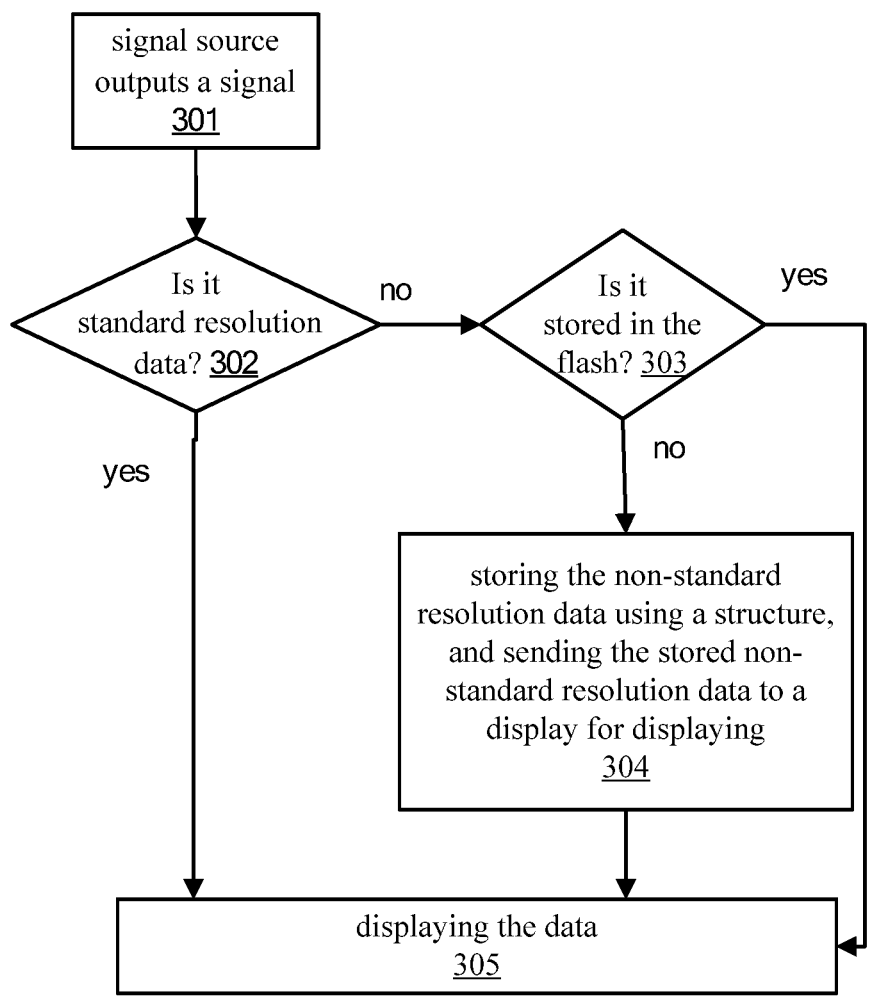
FIG. 3 is a flow chart of an example of a method for displaying non-standard resolution data provided by an embodiment of the present disclosure.

In some embodiments, the method 200 for displaying the non-standard resolution data may further comprise: in a case that the signal source data belongs to the standard resolution data, displaying the signal source data with the standard resolution (referring to FIG. 3 for details).

With this method, all the non-standard data and standard data can be displayed, which enables the terminal display device to work with all the signal sources.

An example is provided below with reference to FIG. 3.

The non-standard resolution data is stored in a flash and an ID number is allocated to each storage object in the example provided in FIG. 3. A specific process includes the following.

In step 301, the signal source outputs a signal, and a display terminal reads the signal output by the signal source.

In step 302, the display terminal determines whether the read signal source data is standard resolution data. For example, the display terminal obtains the following parameters from the read signal source data: the number of pixels in the horizontal direction, the number of pixels in the vertical direction, the start dotting position for the horizontal direction, and the start dotting position for the vertical direction. Then, the display terminal compares the obtained parameters with relevant parameters corresponding to the standard resolution data. In a case that the corresponding parameters are the same, it is determined that the read signal source data belongs to the standard resolution data; otherwise, the read signal source data belongs to the non-standard resolution data. In a case that the read signal source data belongs to the standard resolution data, step 305 is performed; otherwise, step 303 is performed.

In the step 303, it is determined whether the non-standard resolution data is already stored in the flash. In a case that the non-standard resolution data is already stored in the flash, the step 305 is performed; otherwise, step 304 is performed.

For example, the number of pixels in the horizontal direction, the number of pixels in the vertical direction, the start dotting position for the horizontal direction, and the start dotting position for the vertical direction of the signal source data are compared with parameter values corresponding to the non-standard resolution data stored in the flash. For example, when the absolute values of the differences between the corresponding compared parameters are all less than 20, it can be determined that the non-standard resolution data is already stored in the flash. Here, the absolute value "20" of the difference is only illustrated by way of examples, and different absolute values of the difference can be chosen according to different application scenarios. In another example, the absolute value of the difference may be set as 10. At this point, in a case that the following four conditions are satisfied at the same time, it can be determined that the non-standard resolution data is already stored in the flash: the difference between the number of pixels in the horizontal direction corresponding to the signal source data and the number of pixels in the horizontal direction corresponding to a piece of stored non-standard resolution data is 5, the difference between the number of pixels in the vertical direction corresponding to the signal source data and the number of pixels in the vertical direction corresponding to the piece of stored non-standard resolution data is 7, the difference between the start dotting position for the horizontal direction corresponding to the signal source data and the start dotting position for the horizontal direction corresponding to the piece of stored non-standard resolution data is 6, and the difference between the start dotting position for the vertical direction corresponding to the signal source data and the start dotting position for the vertical direction corresponding to the piece of stored non-standard resolution data is 6.

When executing the step 304 (it is already determined that the non-standard resolution data is not stored in the flash in the above step 303), the non-standard resolution data can be stored using the structure in the above step 261, where the structure at least comprises the number of pixels in the horizontal direction, the number of pixels in the vertical direction, the start dotting position for the horizontal direction, and the start dotting position for the vertical direction of the non-standard resolution data. In addition, the structure may further comprise an ID number allocated for the non-standard resolution data. Then, the stored non-standard resolution data is sent to the display to perform the step 305.

For example, implementation of the above step 304 includes: storing the number of pixels in the horizontal direction, the number of pixels in the vertical direction, the start dotting position for the horizontal direction, and the start dotting position for the vertical direction of the signal source data obtained from the signal source in the flash. In addition, each newly stored non-standard resolution data may be allocated with an ID number for the convenience of addressing or searching, and the ID number may be an Arabic numeral.

In the step 305, it is displayed according to the received standard resolution data or non-standard resolution data.

For example, a display image of the non-standard resolution data adopting the above solution may be an image that does not cover the full screen. A width, height, and start displaying position of the image that does not cover the full screen are all provided by the stored non-standard resolution data.

Figure 4:
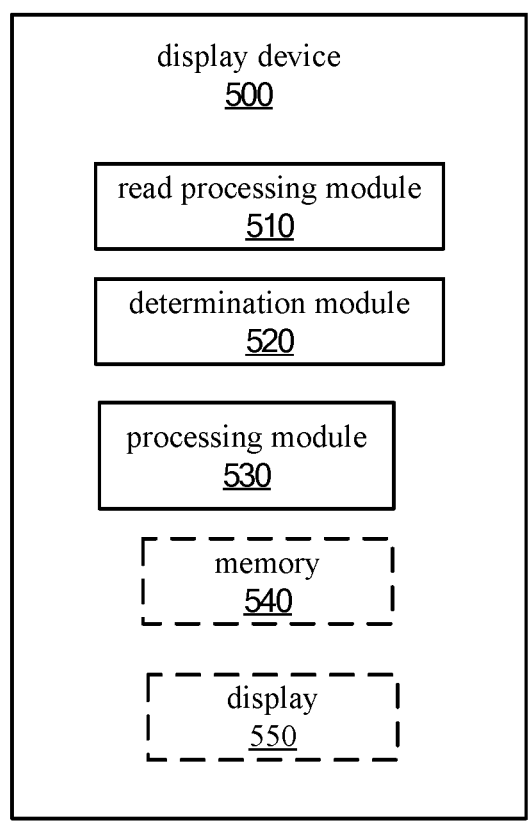
FIG. 4 is a block diagram of a device for displaying non-standard resolution data provided by an embodiment of the present disclosure.

As illustrated in FIG. 4, at least one embodiment of the present disclosure also provides a device 500 for displaying non-standard resolution data. The device 500 for displaying the non-standard resolution data may comprise a read processing module 510, a determination module 520 and a processing module 530. In addition, the display device 500 may further comprise a memory 540 and a display 550. The read processing module 510 is configured to read signal source data. The determination module 520 is configured to determine whether the signal source data is standard resolution data. When it is determined that the signal source data is non-standard resolution data, the processing module 530 is configured to perform the following operations: determining whether the non-standard resolution data is already stored in a memory; in a case that the non-standard resolution data is already stored in the memory, displaying the non-standard resolution data; and in a case that the non-standard resolution data is not stored ill the memory, storing the non-standard resolution data in the memory and displaying the non-standard resolution data.

In some embodiments, the read processing module 510 is further configured to obtain relevant parameter information from the signal source data. For example, the reading processing module 510 reads the signal source data firstly, and then obtains at least the following parameter information from the read data: a quantity of pixels in a horizontal direction, a quantity of pixels in a vertical direction, a start dotting position for the horizontal direction, and a start dotting position for the vertical direction. At this point, the determination module 520 compares the obtained parameter information of the signal source data with relevant parameter information corresponding to the standard resolution data, and then determines that the read signal source data belongs to the standard resolution data or the non-standard resolution data.

In some embodiments, the processing module 530 may further be configured to use a unique identifier to store the non-standard resolution data in an allocated storage address and store a start address of the storage address. At this point, the non-standard resolution data is stored in the memory illustrated in FIG. 4. For example, the memory 540 here may be a flash.

In some embodiments, the processing module 530 is further configured to store the non-standard resolution data according to the defined unique identifier and the start address. The identifier defined here may be represented as a number. For example, it may be respectively numbered in the order of 1, 2, 3, . . . according to a storage order of the non-standard resolution data. The start address is used to address the stored non-standard resolution data.

In some embodiments, the processing module 530 is further configured to store the non-standard resolution data using a structure. The structure may comprise parameter information extracted from the signal source data by the read processing module 510. For example, the structure at least comprises: the number of pixels in the horizontal direction, the number of pixels in the vertical direction, the start dotting position for the horizontal direction, and the start dotting position for the vertical direction. In addition, the structure may further comprise a horizontal frequency and a vertical frequency, where the horizontal frequency refers to a process of scanning all the pixels in an order from left to right and from top to bottom, and the vertical frequency refers to the number of times that the screen is refreshed every second.

In some embodiments, in a case that the determination module 520 determines that the signal source data belongs to the standard resolution data, the standard resolution is used for displaying. At this point, the standard resolution data may be directly used for displaying on the display.

In some embodiments, the device 500 for displaying the non-standard resolution data further comprises a display, which is configured to display the standard resolution data or directly display the non-standard resolution data. Types of the display 550 comprise, but are not limited to, an LCD display, an LED display, or the like.

The display device illustrated in FIG. 4 receives an input video signal from the signal source. Types of the signal source may comprise: devices with a stable video output signal such as a personal computer, a signal generator, a set-top box, or the like. In addition, the video signal output by the signal source in this embodiment may be standard resolution data or may be non-standard resolution data.

Figure 5:
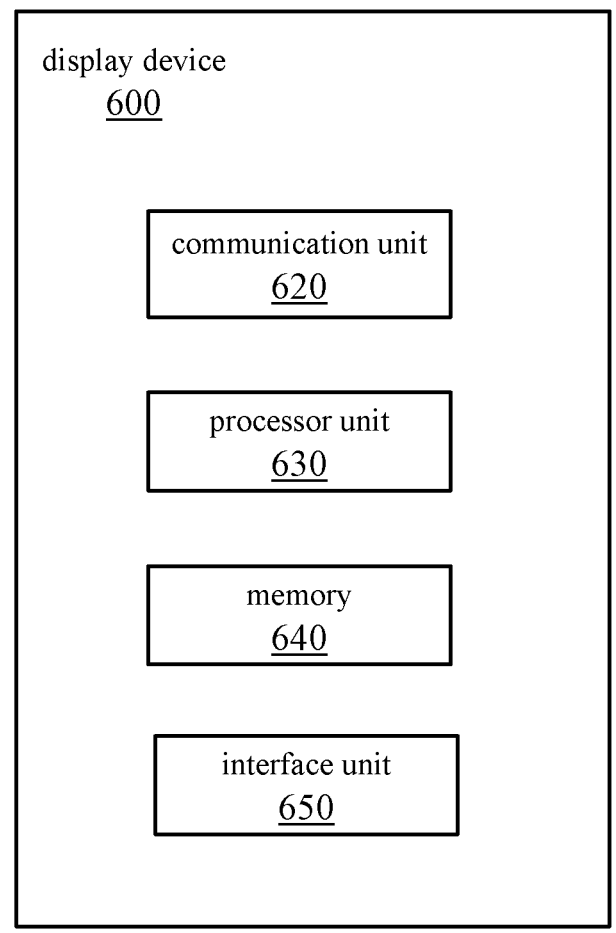
FIG. 5 is a schematic diagram of a hardware structure of an optional display device for implementing embodiments of the present disclosure.

FIG. 5 is a schematic diagram of a hardware structure of an optional display device for implementing the embodiments of the present disclosure.

A display device 600 may comprise a communication unit 620, a processor unit 630, a memory 640, an interface unit 650, and the like. FIG. 5 illustrates an electronic device with various components. However, it should be understood that not all the illustrated components are required to be implemented. More or fewer components may be implemented alternatively. Elements of the display device are described below in detail.

The communication unit 620 generally comprises one or more components and allows communication between the display device and a wireless communication system or a wired network.

The processor unit 630 may be configured to read stored executable codes from the memory 640 and execute operations corresponding to the codes, so as to control the communication and interaction between the electronic device and the outside world. For example, the processor unit 630 may be configured to perform the functions of the non-standard resolution display method illustrated in FIG. 2. The processor unit 630 may also be configured to perform the functions of the relevant modules such as the read processing module illustrated in FIG. 4.

The memory 640 may store software programs and the like for processing and controlling operations that are performed by the processor unit 630, or may temporarily store data (e.g., collected voice data, etc.) that is already output or about to be output. For example, the memory may also store the non-standard resolution data that is stored in the newly defined structure.

The memory 640 may comprise at least one type of storage mediums. The storage mediums comprise a flash, a hard disk, a multimedia card, a card-type memory (e.g., a SD or a DX memory, etc.), a random access memory (RAM), a static random access memory (SRAM), a read-only memory (ROM), an electrically erasable programmable read-only memory (EEPROM), a programmable read-only memory (PROM), a magnetic memory, a magnetic disk, an optical disk, and the like.

The interface unit 650 is configured as an interface through which at least one external device can connect with the terminal. For example, the external device may comprise a wired or wireless headset port, a port for an external power supply (or a battery charger), a wired or wireless data port, a memory card port, a port for connecting a device with an identification module, an audio input/output (I/O) port, a video I/O port, a headset port, and the like. The identification module may store various kinds of information for verifying a user that uses the mobile terminal, and may comprise a user identification module (UIM), a subscriber identification module (SIM), a universal subscriber identification module (USIM), and the like.

The various embodiments described here may be implemented by using computer software, hardware, or other computer readable medium of any combination. For hardware implementation, the embodiments described here may be implemented by using one of an application specific integrated circuit (ASIC), a digital signal processor (DSP), a digital signal processing device (DSPD), a programmable logic device (PLD), a field programmable gate array (FPGA), a processor, a controller, a microcontroller, a microprocessor, and an electronic unit designed to perform the functions described here. In some cases, the embodiments may be implemented in a processor unit. For software implementation, the embodiments such as procedures or functions may be implemented by separate software modules that allow performing at least one function or one operation. The software codes may be implemented by a software application program (or a program) written in any suitable programming language, and the software codes may be stored in a memory and executed by a processor unit.

Those skilled in the art may conceive that the devices and algorithm steps combined with the examples described in the embodiments disclosed in the present disclosure may be implemented by electronic hardware or a combination of computer software and electronic hardware. Whether these functions are implemented by hardware or software depends on the specific application and design constraints of the technical solutions. Those skilled may implement the described functions in different ways for each particular application, but such implementation should not be construed as out of the scope of the present disclosure.

Those skilled in the art may clearly understand that, for the convenience and simplicity of description, the specific working processes of the equipment and devices described above may refer to the corresponding processes in the embodiments of the foregoing method, and details are not described here again.

In several embodiments provided in the present disclosure, it should be understood that the disclosed devices and methods may be implemented in other ways. For example, the devices of the embodiments described above are merely exemplary. For example, the division of the units is merely a logical function division and there may be other division in actual implementation. For example, multiple units or components may be combined or be integrated with another device, or some features may be ignored or not executed. The units described as separate components may be or may not be physically separated, and the components as display units may be or may not be physical units. Some or all of the units may be selected according to actual needs to achieve the objectives of the solutions in the embodiments.

The functions may be stored in a computer readable storage medium in a case that the functions are implemented in the form of software functional units and sold or used as separate products. Based on this understanding, the technical solutions of the present disclosure, or the part contributing to the prior art, or part of the technical solutions may be implemented in the form of a software product. The computer software product is stored in a storage medium and comprises a certain number of instructions that are used to enable a computer device (which may be a personal computer, a server, a network device, or the like) to execute all or a part of the steps of the method according to each embodiment of the present disclosure. The foregoing storage medium comprises: various mediums capable of storing program codes such as a USB flash disk, a mobile hard disk, a read-only memory, a random access memory, a magnetic disk, an optical disk, or the like.

The foregoing descriptions are only the specific embodiments of the present disclosure, and the scope of protection of the present disclosure is not limited thereto. Modifications or alternations easily made by anyone skilled in the art within the technical scope disclosed by the present disclosure shall all fall within the scope of protection of the present disclosure. Therefore, the scope of protection of the present disclosure should be defined by the appended claims.

The application claims priority to the Chinese patent application No. 201710013819.5, filed on Jan. 9, 2017, the entire disclosure of which is incorporated herein by reference as part of the present application.

What is claimed is:

1. A method for displaying non-standard resolution data, comprising:
   reading signal source data and determining whether the signal source data is standard resolution data;
   in a case that the signal source data is non-standard resolution data, comparing parameters corresponding to latest-obtained non-standard resolution data with parameters corresponding to non-standard resolution data that is already stored in a memory one by one;
   displaying the non-standard resolution data in a case that differences obtained by comparing the parameters are all within setting ranges; and
   storing the non-standard resolution data in the memory and displaying the non-standard resolution data in a case that differences obtained by comparing the parameters are not all within the setting ranges.

2. The method for displaying non-standard resolution data according to claim 1, wherein storing the non-standard resolution data in the memory comprises:
   allocating a unique identifier and a unique storage address for the non-standard resolution data, and collectively storing the non-standard resolution data, the unique identifier and a start address of the storage address.

3. The method for displaying non-standard resolution data according to claim 2,
   further comprising: searching the memory to determine whether the non-standard resolution data is stored in the memory; and
   in a case that differences obtained by comparing the parameters are all within the setting ranges, the non-standard resolution data is addressed using the unique identifier and the start address.

4. The method for displaying non-standard resolution data according to claim 1, wherein storing the non-standard resolution data in the memory comprises:
storing the non-standard resolution data in the memory using a structure;
wherein the structure comprises: a total number of pixels in a horizontal direction, a total number of pixels in a vertical direction, a start dotting position for the horizontal direction, a start dotting position for the vertical direction, a horizontal frequency and a vertical frequency.

5. The method for displaying non-standard resolution data according to claim 4, wherein the structure further comprises: a storage start position.

6. The method for displaying non-standard resolution data according to claim 4, wherein the structure further comprises a storage serial number, and the storage serial number is used for representing which type of non-standard resolution data the non-standard resolution data to be stored is.

7. The method for displaying non-standard resolution data according to claim 4, wherein the structure further comprises an automatic time parameter, and the automatic time parameter is a parameter for automatically aligning an analog signal.

8. The method for displaying non-standard resolution data according to claim 1,
wherein the parameters at least comprise a quantity of pixels in a horizontal direction, a quantity of pixels in a vertical direction, a start dotting position for the horizontal direction and a start dotting position for the vertical direction.

9. The method for displaying non-standard resolution data according to claim 8, wherein comparing parameters corresponding to latest-obtained non-standard resolution data with parameters corresponding to non-standard resolution data that is already stored in the memory one by one comprises:
comparing the quantity of pixels in the horizontal direction, the quantity of pixels in the vertical direction, the start dotting position for the horizontal direction and the start dotting position for the vertical direction of the latest-obtained non-standard data with corresponding parameter values of the non-standard data that is already stored in the memory.

10. The method for displaying non-standard resolution data according to claim 1, wherein the standard resolution data comprise: data that meets a video electronics standards association (VESA) standard or data that meets a data management platform (DMP) standard.

11. The method for displaying non-standard resolution data according to claim 1, further comprising:
in a case that the signal source data belongs to the standard resolution data, displaying with a standard resolution.

12. A device for displaying non-standard resolution data, comprising a memory and a processor; wherein:
the memory is configured to store computer instructions; and
the processor is configured to, when executing the computer instructions, perform operations including:
reading signal source data;
determining whether the signal source data is standard resolution data; and
in a case that it is determined that the signal source data is non-standard resolution data, performing the following operations:
comparing parameters corresponding to latest-obtained non-standard resolution data with parameters corresponding to non-standard resolution data that is already stored in the memory one by one;
displaying the non-standard resolution data in a case that differences obtained by comparing the parameters are all within setting ranges; and
storing the non-standard resolution data in the memory and displaying the non-standard resolution data in a case that differences obtained by comparing the parameters are not all within the setting ranges.

13. The device for displaying non-standard resolution data according to claim 12, wherein the processor is further configured to perform operations including:
storing the non-standard resolution data in an allocated storage address using a unique identifier, and storing a start address of the storage address.

14. The device for displaying non-standard resolution data according to claim 13, wherein the processor is further configured to search the stored non-standard resolution data according to the unique identifier and the start address.

15. The device for displaying non-standard resolution data according to claim 12, wherein in a case that differences obtained by comparing the parameters are not all within the setting ranges, the processor is further configured to store the non-standard resolution data using a structure, and the structure comprises: a total number of pixels in a horizontal direction, a total number of pixels in a vertical direction, a start dotting position for the horizontal direction, a start dotting position for the vertical direction, a horizontal frequency and a vertical frequency.

16. The device for displaying non-standard resolution data according to claim 15, wherein the structure further comprises: a storage start position.

17. The device for displaying non-standard resolution data according to claim 15, wherein the structure further comprises a storage serial number, and the storage serial number is used for representing which type of non-standard resolution data the non-standard resolution data to be stored is.

18. The device for displaying non-standard resolution data according to claim 15, wherein the structure further comprises an automatic time parameter, and the automatic time parameter is a parameter for automatically aligning an analog signal.

19. The device for displaying non-standard resolution data according to claim 12, wherein the standard resolution is used for displaying, in a case that the determining module determines that the signal source data belongs to the standard resolution data.

20. The device for displaying non-standard resolution data according to claim 12, further comprising:
a display, configured to display the standard resolution data or directly display the non-standard resolution data.

* * * * *